(12) United States Patent
Tokieda et al.

(10) Patent No.: US 11,919,034 B2
(45) Date of Patent: Mar. 5, 2024

(54) INTERMITTENT COATING DEVICE

(71) Applicant: Panasonic Intellectual Property Management Co., Ltd., Osaka (JP)

(72) Inventors: Daisuke Tokieda, Kyoto (JP); Yuta Fukutomi, Osaka (JP); Naoyuki Koide, Hyogo (JP); Yoshinori Sakai, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/296,541

(22) PCT Filed: Oct. 25, 2019

(86) PCT No.: PCT/JP2019/042042
§ 371 (c)(1),
(2) Date: May 24, 2021

(87) PCT Pub. No.: WO2020/129409
PCT Pub. Date: Jun. 25, 2020

(65) Prior Publication Data
US 2022/0023908 A1    Jan. 27, 2022

(30) Foreign Application Priority Data
Dec. 18, 2018  (JP) .................. 2018-236660

(51) Int. Cl.
*B05C 5/02*     (2006.01)
*B05C 11/10*    (2006.01)
(Continued)

(52) U.S. Cl.
CPC ........ *B05C 5/0225* (2013.01); *B05C 11/1026* (2013.01); *H01M 4/0411* (2013.01); *H01M 10/0525* (2013.01)

(58) Field of Classification Search
None
See application file for complete search history.

(56) References Cited

U.S. PATENT DOCUMENTS

| 6,037,009 A | * | 3/2000 | Clare | .................. B05C 11/1044 |
| | | | | 427/288 |
| 6,716,478 B2 | * | 4/2004 | Kitano | .................. B05C 5/0208 |
| | | | | 438/782 |
| 2007/0026312 A1 | | 2/2007 | Imachi et al. | |

FOREIGN PATENT DOCUMENTS

| JP | 2006-107735 A | 4/2006 |
| JP | 2007-035589 A | 2/2007 |

(Continued)

OTHER PUBLICATIONS

International Search Report issued in corresponding Internaitonal Patent Application No. PCT/JP2019/042042, dated Nov. 26, 2019, with English translation.

*Primary Examiner* — Jethro M. Pence
(74) *Attorney, Agent, or Firm* — Rimon P.C.; Tomoki Tanida

(57) ABSTRACT

An intermittent coating device includes a die used to apply a coating material onto a material to be coated, and a first intermittent valve and a second intermittent valve capable of switching between a first state in which the coating material is supplied to the die and a second state in which the supply of the coating material is stopped. The first intermittent valve and the second intermittent valve have different timings of switching between the first state and the second state.

6 Claims, 6 Drawing Sheets

(51) Int. Cl.
*H01M 4/04* (2006.01)
*H01M 10/0525* (2010.01)

(56) References Cited

FOREIGN PATENT DOCUMENTS

| | | | | |
|---|---|---|---|---|
| JP | 2010-108678 A | | 5/2010 | |
| JP | 2014-137944 A | | 7/2014 | |
| JP | 2016-147216 A | | 8/2016 | |
| JP | 2016147216 A | * | 8/2016 | ............... B05C 5/02 |
| JP | 2018-094507 A | | 6/2018 | |

* cited by examiner

INTERMITTENT COATING DEVICE

CROSS-REFERENCE TO RELATED APPLICATIONS

This application is the U.S. National Phase under U.S.C. § 371 of International Patent Application No. PCT/JP2019/042042, filed Oct. 25, 2019, which in turn claims the benefit of Japanese Patent Application No. 2018-236660, filed on Dec. 18, 2018 the entire disclosures of which Applications are incorporated by reference herein.

BACKGROUND

Field of the Invention

The present disclosure relates to an intermittent coating device.

Description of the Related Art

In recent years, with widespread use of electric vehicles (EV), hybrid vehicles (HV), and plug-in hybrid vehicles (PHV), for example, shipment of secondary batteries has been increasing. Particularly, lithium-ion secondary batteries are increasingly shipped. A general secondary battery mainly includes a positive plate, a negative plate, a separator, and an electrolyte as constituting elements. An electrode plate, such as the positive plate or negative plate, has a structure in which an electrode active material is laminated on a surface of a current collector made of metallic foil.

As a method for manufacturing such an electrode plate, a method has been conventionally known in which electrode slurry is intermittently applied on a surface of elongated metallic foil using an intermittent coating device that includes a die used to discharge electrode slurry obtained by mixing an active material and a solvent, and an intermittent valve used to switch supply and non-supply of the electrode slurry to the die (see Patent Literature 1, for example).

Patent Literature 1: Japanese Unexamined Patent Application Publication No. 2010-108678

With the increasing shipment of secondary batteries, there is a need to reduce manufacturing time of electrode plates. However, if electrode slurry is intermittently applied on metallic foil at high speed so as to reduce the manufacturing time of electrode plates, accuracy of applying the electrode slurry may be degraded because of responsiveness limitation of the intermittent valve. The degraded application accuracy may cause degradation in quality of electrode plates.

SUMMARY OF THE INVENTION

The present disclosure has been made in view of such a situation, and a purpose thereof is to provide a technology for enabling both the reduction of manufacturing time and the quality maintenance of electrode plates.

One embodiment of the present disclosure relates to an intermittent coating device. The intermittent coating device includes a die used to apply a coating material onto a material to be coated, and a first intermittent valve and a second intermittent valve capable of switching between a first state in which the coating material is supplied to the die and a second state in which the supply of the coating material is stopped. The first intermittent valve and the second intermittent valve have different timings of switching between the first state and the second state.

Optional combinations of the aforementioned constituting elements, and implementation of the present disclosure, including the expressions, in the form of methods, apparatuses, or systems may also be practiced as additional modes of the present disclosure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
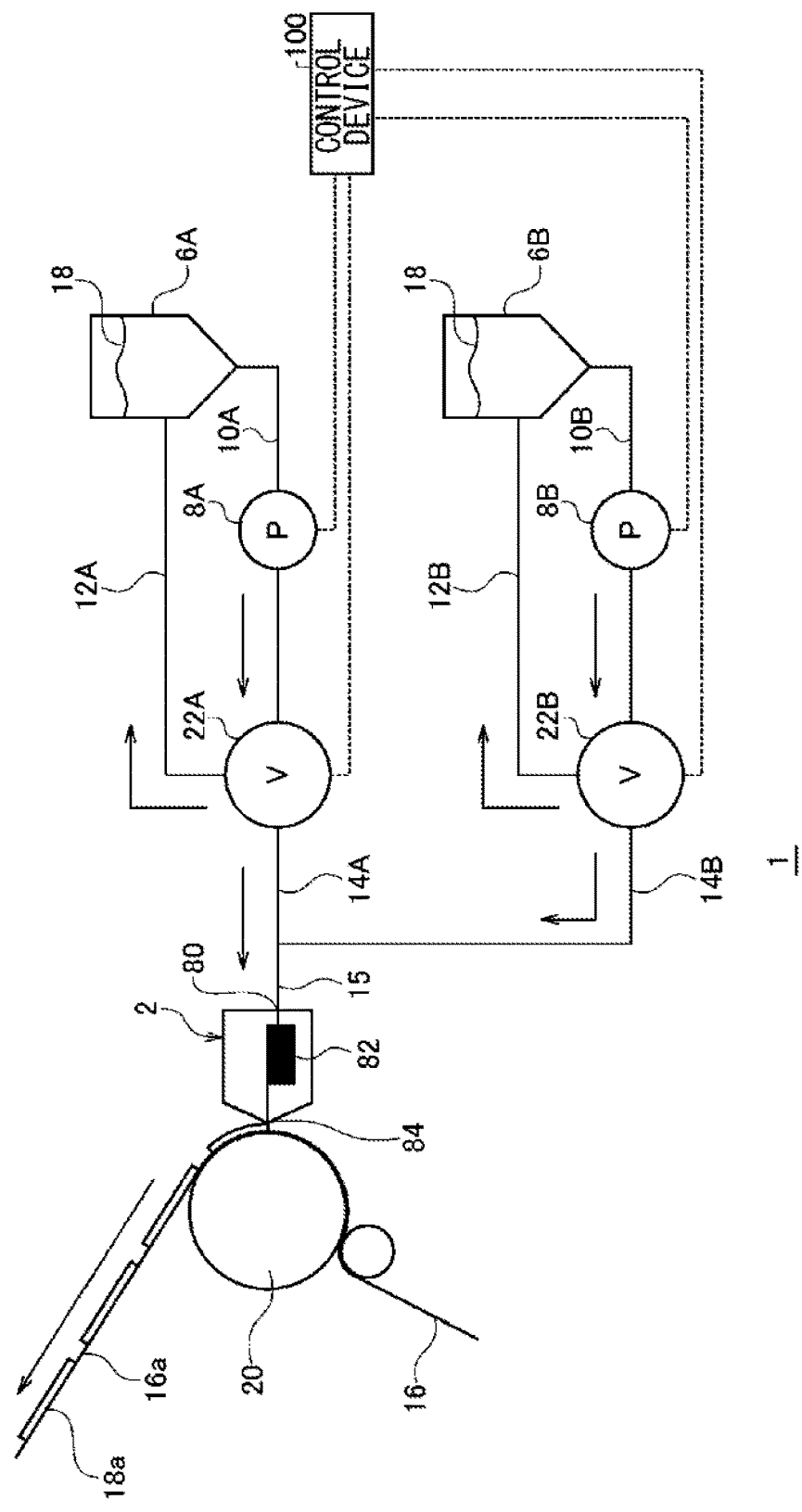
FIG. 1 is a schematic diagram of an intermittent coating device according to a first embodiment.

In the following, the present disclosure will be described based on a preferred embodiment with reference to the drawings. The embodiment is intended to be illustrative only and not to limit the invention, so that it should be understood that not all of the features or combinations thereof described in the embodiment are necessarily essential to the invention. Like reference characters denote like or corresponding constituting elements, members, and processes in each drawing, and repetitive description will be omitted as appropriate.

Also, the scale or shape of each component shown in each drawing is defined for the sake of convenience to facilitate the explanation and is not to be regarded as limitative unless otherwise specified. Also, when the terms "first", "second", and the like are used in the present specification or claims, such terms do not imply any order or degree of importance and are used to distinguish one configuration from another, unless otherwise specified. Further, in each drawing, part of a member less important in describing the embodiment may be omitted.

First Embodiment

FIG. 1 is a schematic diagram of an intermittent coating device according to a first embodiment. An intermittent coating device 1 includes a die 2, a first intermittent valve 22A and a second intermittent valve 22B, a first tank 6A and a second tank 6B, a first pump 8A and a second pump 8B, a first feed pipe conduit 10A and a second feed pipe conduit 10B, a first return pipe conduit 12A and a second return pipe conduit 12B, and a first die supply pipe conduit 14A and a second die supply pipe conduit 14B.

The first intermittent valve 22A and the second intermittent valve 22B have the same structure. Accordingly, when there is no need to distinguish them, the first intermittent valve 22A and the second intermittent valve 22B may be collectively referred to as intermittent valves 22. Similarly, in the following, the first tank 6A and the second tank 6B may be collectively referred to as tanks 6, the first pump 8A and the second pump 8B may be collectively referred to as pumps 8, the first feed pipe conduit 10A and the second feed pipe conduit 10B may be collectively referred to as feed pipe conduits 10, the first return pipe conduit 12A and the second return pipe conduit 12B may be collectively referred to as return pipe conduits 12, and the first die supply pipe conduit 14A and the second die supply pipe conduit 14B may be collectively referred to as die supply pipe conduits 14, as appropriate.

The die 2 is a tool used to apply a coating material 18 onto a material 16 to be coated. The intermittent coating device 1 according to the present embodiment is used to manufacture electrode plates of secondary batteries. An electrode plate of a secondary battery is a sheet electrode material obtained by drying a current collector on which electrode slurry is applied. Accordingly, in the present embodiment, the material 16 to be coated is a current collector of a secondary battery, and the coating material 18 is electrode slurry of a secondary battery. The current collector may be metallic foil, for example. The electrode slurry may be a mixture of a positive-electrode active material or a negative-electrode active material and a solvent, for example. In the case of a general lithium-ion secondary battery, the positive electrode plate is prepared by applying slurry containing a positive-electrode active material, such as lithium cobalt oxide and lithium iron phosphate, onto aluminum foil. Also, the negative electrode plate is prepared by applying slurry containing a negative-electrode active material, such as graphite, onto copper foil.

The die 2 includes a supply port 80, a manifold 82, and a discharge port 84. The first die supply pipe conduit 14A and the second die supply pipe conduit 14B are connected to the supply port 80. The supply port 80 communicates with the manifold 82 provided within the die 2. The manifold 82 communicates with the discharge port 84. The coating material 18 supplied to the die 2 reaches the discharge port 84 through the supply port 80 and the manifold 82, so as to be discharged through the discharge port 84. The manifold 82 is space having a larger volume than the flow passage from the supply port 80 to the manifold 82 or the flow passage from the manifold 82 to the discharge port 84. For example, the manifold 82 may be space of a rectangular shape longer in a horizontal direction. The coating material 18 flowing through the supply port 80 into the die 2 is temporarily stored in the manifold 82 and then discharged through the discharge port 84. Accordingly, the coating material 18 can be stably discharged through the discharge port 84.

The die 2 is disposed such that the discharge port 84 thereof faces a circumferential surface of a backup roll with a certain space therebetween. The material 16 to be coated is continuously conveyed by means of rotation of the backup roll 20 to the position where the backup roll 20 and the discharge port 84 face each other.

To the die 2, the first intermittent valve 22A is connected via the first die supply pipe conduit 14A. Also, to the die 2, the second intermittent valve 22B is connected via the second die supply pipe conduit 14B. The first die supply pipe conduit 14A and the second die supply pipe conduit 14B are merged to be connected to the manifold 82 of the die 2. Accordingly, the intermittent coating device 1 includes a common pipe conduit 15 that serves dually as the first die supply pipe conduit 14A and the second die supply pipe conduit 14B, between the manifold 82 and the junction of the first die supply pipe conduit 14A and the second die supply pipe conduit 14B. Therefore, since only one supply port 80 is required on the die 2 side, design modifications of the die 2 due to increase of the intermittent valves 22 can be avoided.

Each of the first intermittent valve 22A and the second intermittent valve 22B is a mechanism that switches supply and non-supply of the coating material 18 to the die 2. While the coating material 18 is supplied to the die 2, the intermittent coating device 1 can discharge the coating material 18 from the die 2 onto the material 16 to be coated. To the first intermittent valve 22A, the first tank 6A is connected via the first feed pipe conduit 10A and the first return pipe conduit 12A. Also, to the second intermittent valve 22B, the second tank 6B is connected via the second feed pipe conduit 10B and the second return pipe conduit 12B. Each of the first tank 6A and the second tank 6B stores the coating material 18.

On the first feed pipe conduit 10A, the first pump 8A is provided. With the first pump 8A driven, the coating material 18 is fed from the first tank 6A to the first intermittent valve 22A. The first intermittent valve 22A supplies the coating material 18 from the first tank 6A to the die 2 through the first die supply pipe conduit 14A. Also, the first intermittent valve 22A returns the coating material 18 from the first tank 6A to the first tank 6A through the first return pipe conduit 12A.

On the second feed pipe conduit 10B, the second pump 8B is provided. With the second pump 8B driven, the coating material 18 is fed from the second tank 6B to the second intermittent valve 22B. The second intermittent valve 22B supplies the coating material 18 from the second tank 6B to the die 2 through the second die supply pipe conduit 14B. Also, the second intermittent valve 22B returns the coating material 18 from the second tank 6B to the second tank 6B through the second return pipe conduit 12B.

The intermittent coating device 1 includes a first supply system and a second supply system that can independently perform intermittent supply of the coating material 18 to the die 2. The first supply system is constituted by the first intermittent valve 22A, the first tank 6A, the first pump 8A, the first feed pipe conduit 10A, the first return pipe conduit 12A, and the first die supply pipe conduit 14A. The second supply system is constituted by the second intermittent valve 22B, the second tank 6B, the second pump 8B, the second feed pipe conduit 10B, the second return pipe conduit 12B, and the second die supply pipe conduit 14B.

When the first intermittent valve 22A or the second intermittent valve 22B supplies the coating material 18 to the die 2, the coating material 18 is discharged through the discharge port 84 of the die 2, so that an applied part 18a of the coating material 18 can be formed on the material 16 to be coated. Also, when both the first intermittent valve 22A and the second intermittent valve 22B return the coating material 18 to the tank 6, the application of the coating material 18 through the discharge port 84 is stopped, so that an unapplied part 16a of the coating material 18 can be formed on the material 16 to be coated. In other words, with the first intermittent valve 22A and the second intermittent valve 22B, intermittent coating of the coating material 18 can be performed on the material 16 to be coated. The unapplied part 16a is used for pasting of the center lead of an electrode, for example.

Figure 2:
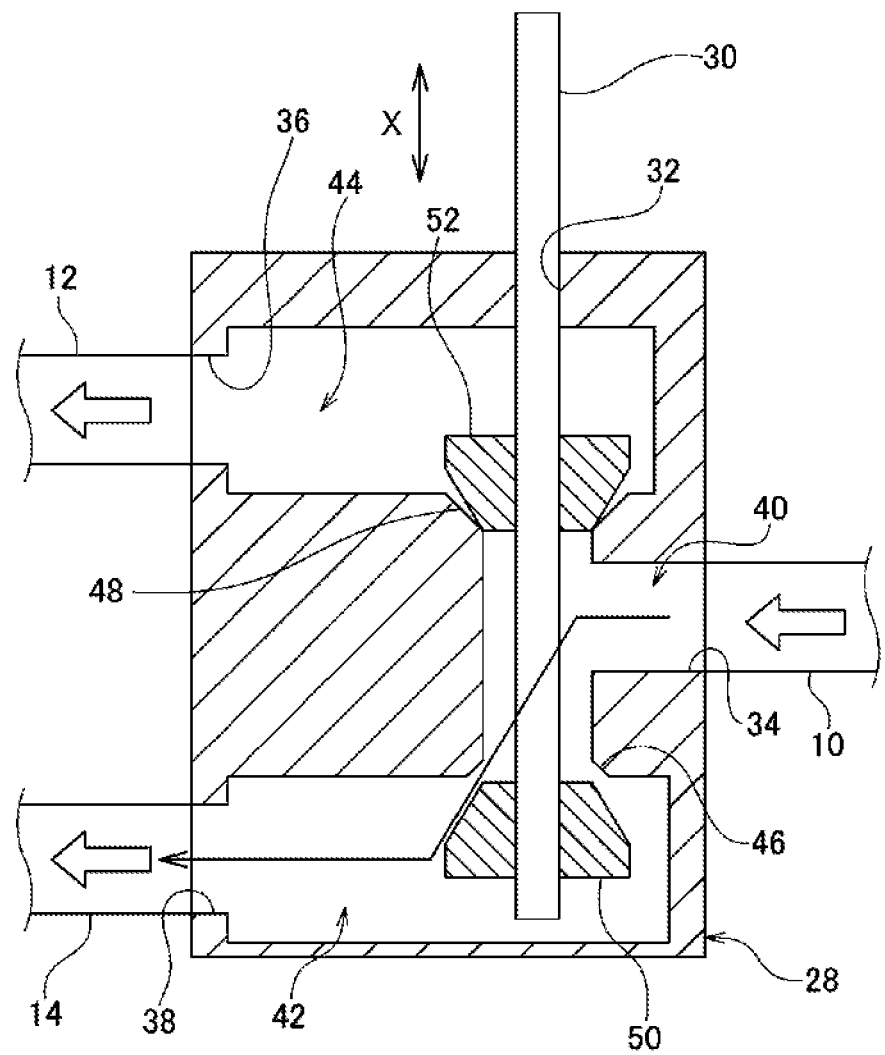
FIG. 2 is a sectional view of an intermittent valve.

FIG. 2 is a sectional view of an intermittent valve. Each intermittent valve 22 includes a cylinder 28 and a piston 30. The cylinder 28 includes a first opening 32 through which the piston 30 is slidably inserted, a second opening 34 to which the feed pipe conduit 10 is connected, a third opening 36 to which the return pipe conduit 12 is connected, and a fourth opening 38 to which the die supply pipe conduit 14 is connected. The cylinder 28 also includes therewithin a branch flow passage 40, a die flow passage 42, and a tank flow passage 44. One end of the branch flow passage 40 is connected to the second opening 34. The other end of the branch flow passage 40 is branched into two; one of the branched ends is connected to one end of the die flow passage 42, and the other of the branched ends is connected to one end of the tank flow passage 44. The other end of the die flow passage 42 is connected to the fourth opening 38, and the other end of the tank flow passage 44 is connected to the third opening 36.

The first opening 32 of the cylinder 28, a first connection part 46 at which the branch flow passage 40 and the die flow passage 42 are connected, and a second connection part 48 at which the branch flow passage 40 and the tank flow passage 44 are connected are arranged such as to lie on a straight line. The first opening 32, the second connection part 48, and the first connection part 46 are arranged in this order. One end side of the piston 30 is inserted through the first opening 32, the second connection part 48, and the first connection part 46.

On the piston 30, a first valve plug 50 is provided near the first connection part 46. Also, on the piston 30 near the second connection part 48, a second valve plug 52 is provided. The first valve plug 50 and the second valve plug 52 are arranged such that the distance therebetween is larger than the distance between the first connection part 46 and the second connection part 48 along a stem direction X of the piston 30.

By shifting the piston 30 along a stem direction X with respect to the cylinder 28, the position of the piston can be changed to a first position and a second position. When the piston 30 is shifted into the cylinder 28 from the second position, the piston 30 is set to the first position; when the piston 30 is shifted out of the cylinder 28 from the first position, the piston 30 is set to the second position. FIG. 2 illustrates the piston 30 located at the first position.

When the piston 30 is located at the first position, a space is formed between the first valve plug 50 and the first connection part 46, so that the branch flow passage 40 and the die flow passage 42 communicate with each other. Meanwhile, the second valve plug 52 is fitted to the second connection part 48. In other words, the second connection part 48 functions as a valve seat for the second valve plug 52. Accordingly, the branch flow passage 40 and the tank flow passage 44 are blocked.

When the piston 30 is located at the second position, the first valve plug 50 is fitted to the first connection part 46. In other words, the first connection part 46 functions as a valve seat for the first valve plug 50. Accordingly, the branch flow passage 40 and the die flow passage 42 are blocked. Meanwhile, a space is formed between the second valve plug 52 and the second connection part 48, so that the branch flow passage 40 and the tank flow passage 44 communicate with each other.

When the piston 30 is located at the first position, the intermittent valve 22 is placed in a first state. Also, when the piston 30 is located at the second position, the intermittent valve 22 is placed in a second state. The first state of the intermittent valve 22 is a state where the coating material 18 is supplied to the die 2. On the other hand, the second state of the intermittent valve 22 is a state where the supply of the coating material 18 to the die 2 is stopped.

More specifically, when the intermittent valve 22 is placed in the first state, the piston 30 is set to the first position, so that the branch flow passage 40 and the die flow passage 42 communicate with each other while the branch flow passage 40 and the tank flow passage 44 are blocked. Accordingly, the coating material 18 flowing into the branch flow passage 40 from the feed pipe conduit 10 via the second opening 34 is supplied to the die 2 via the die flow passage 42, the fourth opening 38, and the die supply pipe conduit 14. When the intermittent valve 22 is placed in the second state, on the other hand, the piston 30 is set to the second position, so that the branch flow passage 40 and the die flow passage 42 are blocked while the branch flow passage 40 and the tank flow passage 44 communicate with each other. Accordingly, the coating material 18 flowing into the branch flow passage 40 from the feed pipe conduit 10 via the second opening 34 is returned to the tank 6 via the tank flow passage 44, the third opening 36, and the return pipe conduit 12.

The piston 30 is switched between the first position and the second position by a drive unit (not illustrated). The drive unit is constituted by a motor, such as a servomotor, and a crank mechanism that connects the motor and the piston 30, for example. Also, the drive unit may be a publicly-known drive source other than a motor, such as an air-driven pump.

Figure 3:
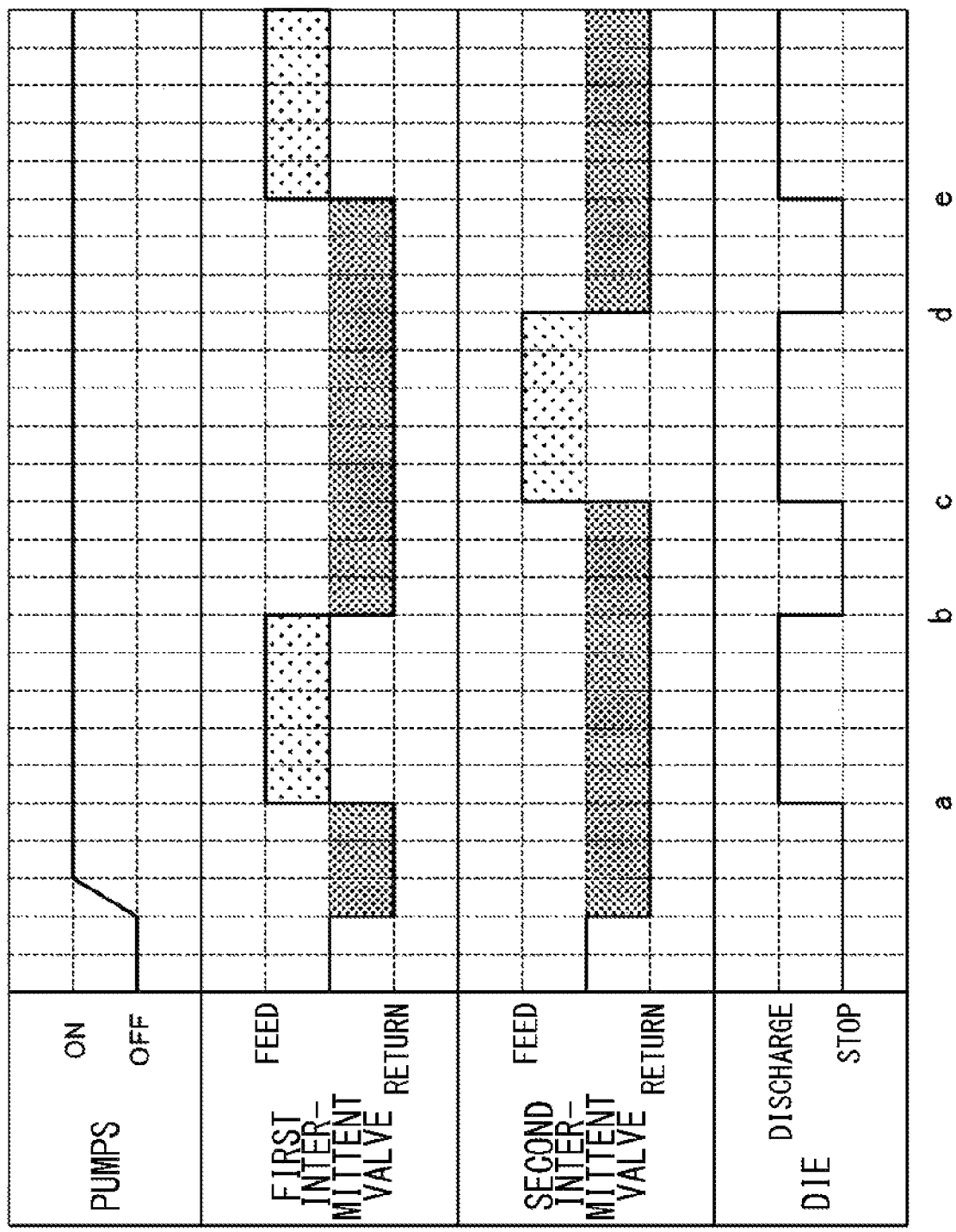
FIG. 3 is a diagram that shows relationships between the states of each intermittent valve and the timings of discharge of a coating material from a die.

FIG. 3 is a diagram that shows relationships between the states of each intermittent valve and the timings of discharge of the coating material from the die. In FIG. 3, "FEED" means that the intermittent valve 22 is placed in the first state, and "RETURN" means that the intermittent valve 22 is placed in the second state. As shown in FIG. 3, the first intermittent valve 22A and the second intermittent valve 22B have different timings of switching between the first state and the second state.

In the present embodiment, when a predetermined period of time has elapsed after the first intermittent valve 22A placed in the first state is switched to the second state, the second intermittent valve 22B placed in the second state is switched to the first state. Also, when a predetermined period of time has elapsed after the second intermittent valve 22B placed in the first state is switched to the second state, the first intermittent valve 22A placed in the second state is switched to the first state.

More specifically, the first pump 8A and the second pump 8B (the "PUMPS" in FIG. 3) are continuously turned on during intermittent coating, so that the coating material 18 is supplied to each of the first intermittent valve 22A and the second intermittent valve 22B. When the driving of the pumps 8 is started, each intermittent valve 22 is placed in the second state. At the time a, the first intermittent valve 22A is switched from the second state to the first state. Meanwhile, the second intermittent valve 22B is maintained in the second state. Accordingly, the die 2 discharges the coating material 18 supplied from the first intermittent valve 22A, so that an applied part 18a is formed on the material 16 to be coated. Thereafter, at the time b, the first intermittent valve 22A is switched from the first state to the second state. Meanwhile, the second intermittent valve 22B is maintained in the second state. Accordingly, in this state, the coating material 18 is not supplied from any intermittent valve 22 to the die 2. Therefore, the discharge of the coating material 18 from the die 2 is stopped, so that an unapplied part 16a is formed on the material 16 to be coated.

Subsequently, the second intermittent valve 22B is switched from the second state to the first state at the time c, which is when a predetermined period of time has elapsed after the time b at which the first intermittent valve 22A is switched from the first state to the second state. Meanwhile, the first intermittent valve 22A is maintained in the second state. Accordingly, the die 2 discharges the coating material 18 supplied from the second intermittent valve 22B, so that an applied part 18a is formed on the material 16 to be coated. Thereafter, at the time d, the second intermittent valve 22B is switched from the first state to the second state. Meanwhile, the first intermittent valve 22A is maintained in the second state. Accordingly, in this state, the coating material 18 is not supplied from any intermittent valve 22 to the die 2. Therefore, the discharge of the coating material 18 from the die 2 is stopped, so that an unapplied part 16a is formed on the material 16 to be coated.

Subsequently, the first intermittent valve 22A is switched from the second state to the first state at the time e, which is when a predetermined period of time has elapsed after the time d at which the second intermittent valve 22B is switched from the first state to the second state. Meanwhile, the second intermittent valve 22B is maintained in the second state. Accordingly, the die 2 discharges the coating material 18 supplied from the first intermittent valve 22A, so that an applied part 18a is formed on the material 16 to be coated. Thereafter, the operations set forth above will be repeated.

The time period from the time a to the time b, the time period from the time c to the time d, and the time period after the time e, for which one of the intermittent valves 22 is placed in the first state, correspond to time of formation of the applied parts 18a. Meanwhile, the time period from the time b to the time c and the time period from the time d to the time e, for which both of the two intermittent valves 22 are placed in the second state, correspond to time of formation of the unapplied parts 16a.

The timings of switching between the first state and the second state of each intermittent valve 22 may be controlled by a control device 100, for example. The control device 100 may be implemented by an element such as a CPU or memory of a computer or by a circuit as a hardware configuration, and by a computer program or the like as a software configuration. FIG. 1 illustrates functional blocks implemented by cooperation of such components. It will be understood by those skilled in the art that these functional blocks may be implemented in a variety of forms by combinations of hardware and software. Based on a control program recorded in a memory, the control device 100 can control the on and off of the drive unit of each intermittent valve 22 and each pump 8.

Alternatively, at the time of assembly of the intermittent coating device 1, the timings of switching between the first state and the second state of each intermittent valve 22 may be set in advance by adjusting the drive unit fitted to the intermittent valve 22, for example, and the operator may use an operating panel (not illustrated) to operate the on and off of each drive unit and each pump 8.

As described above, the intermittent coating device 1 of the present embodiment includes the die 2 used to apply the coating material 18 onto the material 16 to be coated, and the first intermittent valve 22A and the second intermittent valve 22B capable of switching between the first state in which the coating material 18 is supplied to the die 2 and the second state in which the supply of the coating material 18 is stopped. The first intermittent valve 22A and the second intermittent valve 22B have different timings of switching between the first state and the second state.

With a conventional intermittent coating device including only one intermittent valve, high-speed switching between discharge and non-discharge (supply stop) of a coating material from the die is difficult. Particularly, with an intermittent valve that switches supply and non-supply of the coating material to the die by switching normal rotation and reverse rotation of a motor connected to the piston, it is difficult to increase the switching speed to a speed required to enable high-speed intermittent application of the coating material. If the supply and non-supply of the coating material to the die cannot be switched at high speed, accuracy of applying the coating material onto a material to be coated may be degraded when the conveying speed of the material to be coated is increased.

Meanwhile, the intermittent coating device 1 of the present embodiment includes the first intermittent valve 22A and the second intermittent valve 22B that have different timings of switching between the supply and non-supply of the coating material 18, or switching between the first state and the second state. With a combination of the first states and the second states of the two intermittent valves 22, discharge and non-discharge of the coating material 18 from the die 2 can be achieved.

This can respond to a change in the time of formation of the applied parts 18a or the unapplied parts 16a due to increase of the conveying speed of the material 16 to be coated, without increasing the speed of switching between the first state and the second state of each intermittent valve 22. As a result, while the accuracy of applying the coating material 18 is maintained, high-speed intermittent coating is enabled. Therefore, with the intermittent coating device 1 according to the present embodiment, both the reduction of manufacturing time and the quality maintenance of electrode plates can be achieved.

Also, in the present embodiment, the first intermittent valve 22A and the second intermittent valve 22B can be simultaneously placed in the first state. This can increase the amount of the coating material 18 discharged from the die 2. For example, by making the time periods for which the intermittent valves 22 are respectively placed in the first state partially overlap each other, an applied part 18a having a locally thick portion can be formed.

In the present embodiment, when a predetermined period of time has elapsed after the first intermittent valve 22A placed in the first state is switched to the second state, the second intermittent valve 22B placed in the second state is switched to the first state. Also, when a predetermined period of time has elapsed after the second intermittent valve 22B placed in the first state is switched to the second state, the first intermittent valve 22A placed in the second state is switched to the first state. Accordingly, the time of formation of an unapplied part 16a can be adjusted using the difference between the timings of switching the states of the intermittent valves 22, without increasing the speed of switching between the first state and the second state of each intermittent valve 22.

If the conveying speed of the material 16 to be coated is increased for high-speed intermittent coating, the time spent for the formation of the unapplied parts 16a will be reduced. In this case, if the speed of switching between the discharge and non-discharge of the coating material 18 from the die 2 is not sufficient, differences in dimensions of the unapplied parts 16a will be large. In the present embodiment, on the other hand, by staggering a time period for which the first intermittent valve 22A is placed in the first state and a time period for which the second intermittent valve 22B is placed in the first state so as to make a time period for which both of the two intermittent valves 22 are place in the second state, non-supply of the coating material 18 from the die 2 is achieved. This can respond to the reduced time of formation of the unapplied parts 16a due to increase of the conveying speed of the material 16 to be coated, without increasing the speed of switching between the supply and non-supply of the coating material 18 in each intermittent valve 22. As a result, while the accuracy of applying the coating material 18 is maintained, high-speed intermittent coating is enabled.

The intermittent coating device 1 according to the present embodiment also includes the first tank 6A and the second tank 6B that store the coating material 18, the first pump 8A that feeds the coating material 18 from the first tank 6A to the first intermittent valve 22A, and the second pump 8B that feeds the coating material 18 from the second tank 6B to the second intermittent valve 22B. Thus, with the configurations of independently feeding the coating material 18 to the respective intermittent valves 22, the feeding pressures of the coating material 18 from the respective intermittent valves 22 to the die 2 can be independently adjusted. Accordingly, the discharge pressure of the coating material 18 from the die 2 when the coating material 18 is supplied from the first intermittent valve 22A can be made different from that when the coating material 18 is supplied from the second intermittent valve 22B. Therefore, even when there is an individual difference, such as a difference in quality, between the first intermittent valve 22A and the second intermittent valve 22B, the thickness of the applied parts 18*a* can be made uniform. Meanwhile, an applied part 18*a* having a locally thick portion can also be formed.

The intermittent coating device 1 also includes the feed pipe conduits 10 and the return pipe conduits 12 that each connect a tank 6 and an intermittent valve 22, and the pumps 8 provided on the respective feed pipe conduits 10 to feed the coating material 18 from the tanks 6 to the intermittent valves 22. When an intermittent valve 22 is placed in the second state, the coating material 18 is returned to the corresponding tank 6 through the corresponding return pipe conduit 12. Accordingly, since the pumps 8 can be always driven, the intermittent coating device 1 can be simplified.

Second Embodiment

Figure 4:
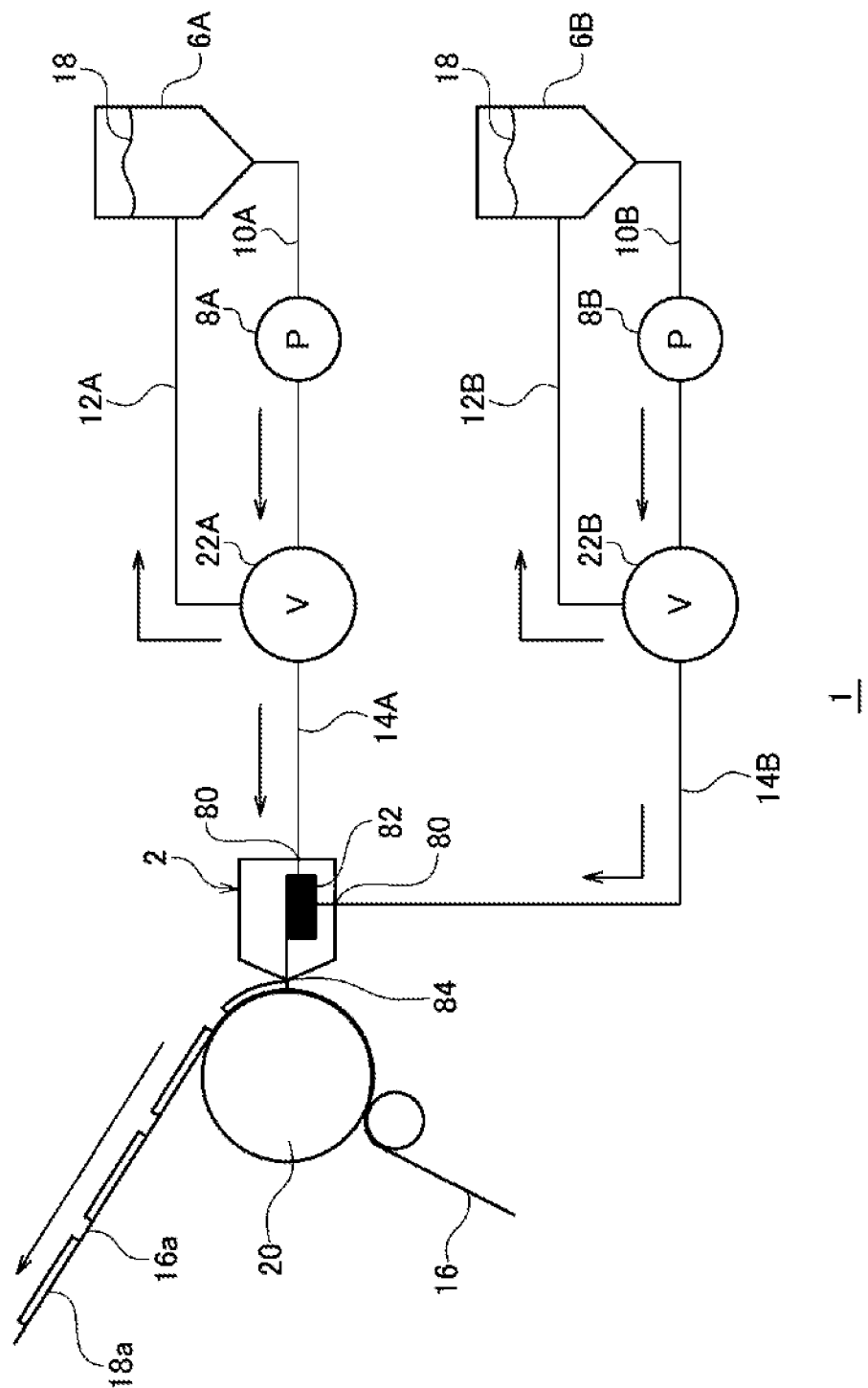
FIG. 4 is a schematic diagram of an intermittent coating device according to a second embodiment.

The second embodiment includes configurations in common with the first embodiment, except the arrangement of the die supply pipe conduits. In the following, the present embodiment will be described mainly for configurations different from those in the first embodiment, and description of configurations in common will be briefly given or may be omitted. FIG. 4 is a schematic diagram of the intermittent coating device according to the second embodiment. In FIG. 4, illustration of the control device 100 is omitted.

The intermittent coating device 1 includes the die 2, the first intermittent valve 22A and the second intermittent valve 22B, the first tank 6A and the second tank 6B, the first pump 8A and the second pump 8B, the first feed pipe conduit 10A and the second feed pipe conduit 10B, the first return pipe conduit 12A and the second return pipe conduit 12B, and the first die supply pipe conduit 14A and the second die supply pipe conduit 14B.

The die 2 includes the supply port 80, the manifold 82, and the discharge port 84. To the die 2, the first intermittent valve 22A is connected via the first die supply pipe conduit 14A, and the second intermittent valve 22B is also connected via the second die supply pipe conduit 14B. In the present embodiment, the first die supply pipe conduit 14A and the second die supply pipe conduit 14B are connected to the manifold 82 without being merged. FIG. 4 illustrates the structure in which each of the first die supply pipe conduit 14A and the second die supply pipe conduit 14B is directly connected to the manifold 82.

Figure 5A:
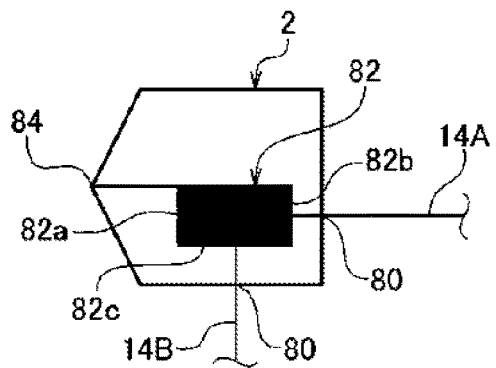
FIGS. 5A-5E are schematic diagrams that each illustrate a connection state of a die and die supply pipe conduits.

FIGS. 5A-5E are schematic diagrams that each illustrate a connection state of the die and the die supply pipe conduits. As illustrated in FIG. 5A, as an example, the first die supply pipe conduit 14A may be connected to a rear side surface 82*b* located opposite to a front side surface 82*a*, to which the discharge port 84 is connected, in the manifold 82. The second die supply pipe conduit 14B may be connected to a bottom surface 82*c* of the manifold 82. The discharge port 84 may be connected with an upper end part of the front side surface 82*a*. The surface to which the first die supply pipe conduit 14A is connected may be another side surface of the manifold 82.

Figure 5B:
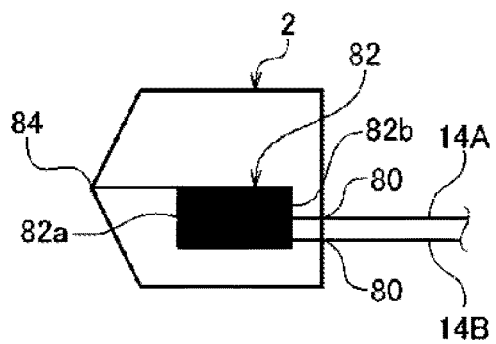

As illustrated in FIG. 5B, as another example, the first die supply pipe conduit 14A and the second die supply pipe conduit 14B may be connected to the rear side surface 82*b* of the manifold 82 and vertically arranged. The discharge port 84 may be connected with an upper end part of the front side surface 82*a*. The surface to which the two die supply pipe conduits 14 are connected may be another side surface of the manifold 82 or may be the bottom surface 82*c*.

Figure 5C:
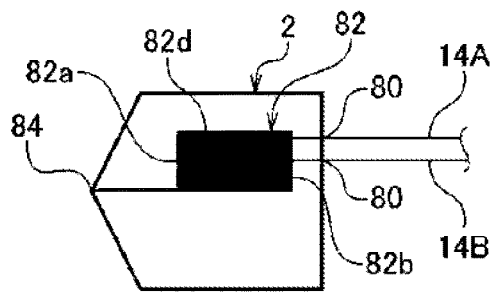

As illustrated in FIG. 5C, as yet another example, the first die supply pipe conduit 14A and the second die supply pipe conduit 14B may be connected to the rear side surface 82*b* of the manifold 82 and vertically arranged. The discharge port 84 may be connected with a lower end part of the front side surface 82*a*. The surface to which the two die supply pipe conduits 14 are connected may be another side surface of the manifold 82 or may be an upper surface 82*d*.

Figure 5D:
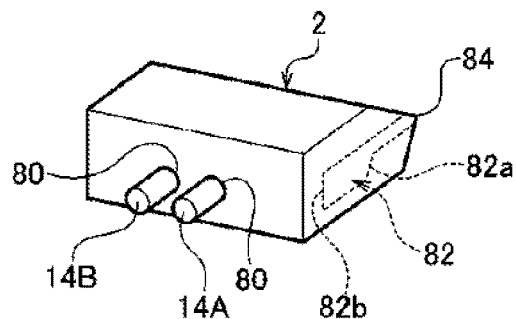

As illustrated in FIG. 5D, as still yet another example, the first die supply pipe conduit 14A and the second die supply pipe conduit 14B may be connected to the rear side surface 82*b* of the manifold 82 and horizontally arranged. The discharge port 84 may be connected with an upper end part of the front side surface 82*a*. The surface to which the two die supply pipe conduits 14 are connected may be another side surface of the manifold 82 or may be the bottom surface 82*c*.

Figure 5E:
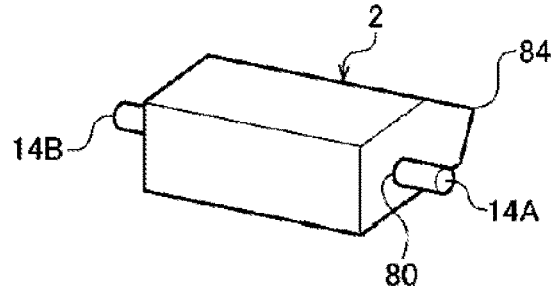

As illustrated in FIG. 5E, as a further example, the first die supply pipe conduit 14A may be connected to the manifold 82 through one of two side surfaces of the die 2 located to the left and right of the discharge port 84. Also, the second die supply pipe conduit 14B may be connected to the manifold 82 through the other of the two side surfaces. In each of the connection states illustrated in FIGS. 5A-5E, the arrangement of the first die supply pipe conduit 14A and the second die supply pipe conduit 14B may be opposite.

Generally, with the configuration in which the coating material 18 is supplied to a single die 2 only through a single die supply pipe conduit 14, so-called suck-back effect can be sufficiently obtained. More specifically, when piston 30 is shifted from the first position to the second position, the piston 30 moves in a direction of getting out of the die flow passage 42. Accordingly, the volume of a portion of the piston 30 positioned within the die flow passage 42 is reduced. This causes negative pressure inside the die flow passage 42, so that part of the coating material 18 flows back from the die 2. Such backflow of the coating material 18 restrains drips of the coating material 18 from the discharge port 84 when the discharge of the coating material 18 from the die 2 is stopped. Thus, the suck-back effect can be obtained.

Meanwhile, the inventors have found that, with the configuration in which the coating material 18 is supplied to a single die 2 independently through two die supply pipe conduits 14, the suck-back effect may not be sufficiently obtained. In the first embodiment, the common pipe conduit is disposed between the manifold 82 and the junction of the first die supply pipe conduit 14A and the second die supply pipe conduit 14B. In this configuration, a case is assumed here in which the first intermittent valve 22A is shifted from the first position to the second position, and the second intermittent valve 22B is then shifted from the second position to the first position thereafter, for example. In this case, the coating material 18 will flow back from the die 2 through the common pipe conduit 15 toward the first intermittent valve 22A because of the suck-back effect caused by the shift of the first intermittent valve 22A. However, after a predetermined period of time elapses, the coating material 18 will flow from the second intermittent valve 22B through the common pipe conduit 15 toward the die 2 because of the shift of the second intermittent valve 22B.

When the time of formation of the unapplied parts 16a is shortened due to high-speed intermittent coating, the interval between a timing at which the first intermittent valve 22A is shifted from the first position to the second position and a timing at which the second intermittent valve 22B is shifted from the second position to the first position is also shortened. Accordingly, within the common pipe conduit 15, the coating material 18 flowing from the die 2 toward the first intermittent valve 22A may collide with the coating material 18 flowing from the second intermittent valve 22B toward the die 2.

When the collision between the coating materials 18 flowing in opposite directions occurs, the suck-back effect may not be sufficiently obtained, so that the coating material 18 may drip from the discharge port 84. Also, the discharge through the discharge port 84 of the coating material 18 fed from the second intermittent valve 22B to the die 2 may be delayed. This may degrade the accuracy of formation of the unapplied parts 16a and the applied parts 18a. The same applies to the case where the second intermittent valve 22B is shifted from the first position to the second position, and the first intermittent valve 22A is then shifted from the second position to the first position thereafter.

Compared to the first embodiment, in the present embodiment, the first die supply pipe conduit 14A and the second die supply pipe conduit 14B are connected to the manifold 82 without being merged. Accordingly, a flow of the coating material 18 from the die 2 toward the first intermittent valve 22A and a flow of the coating material 18 from the second intermittent valve 22B toward the discharge port 84 are coexistent within the manifold 82. The manifold 82 has a larger volume than the common pipe conduit 15. Accordingly, when the flows of the coating material 18 toward opposite directions are coexistent only within the manifold 82, occurrence of the aforementioned collision of the coating material 18 can be reduced. Even if the collision of the coating material 18 occurs, the magnitude of the collision can be made small. Therefore, the reduction of the suck-back effect and the degree of the discharge delay of the coating material 18 can be decreased, so that the accuracy of application of the coating material 18 can be improved.

The timings of switching between the first state and the second state of each of the first intermittent valve 22A and the second intermittent valve 22B are identical with those in the first embodiment.

Third Embodiment

Figure 6:
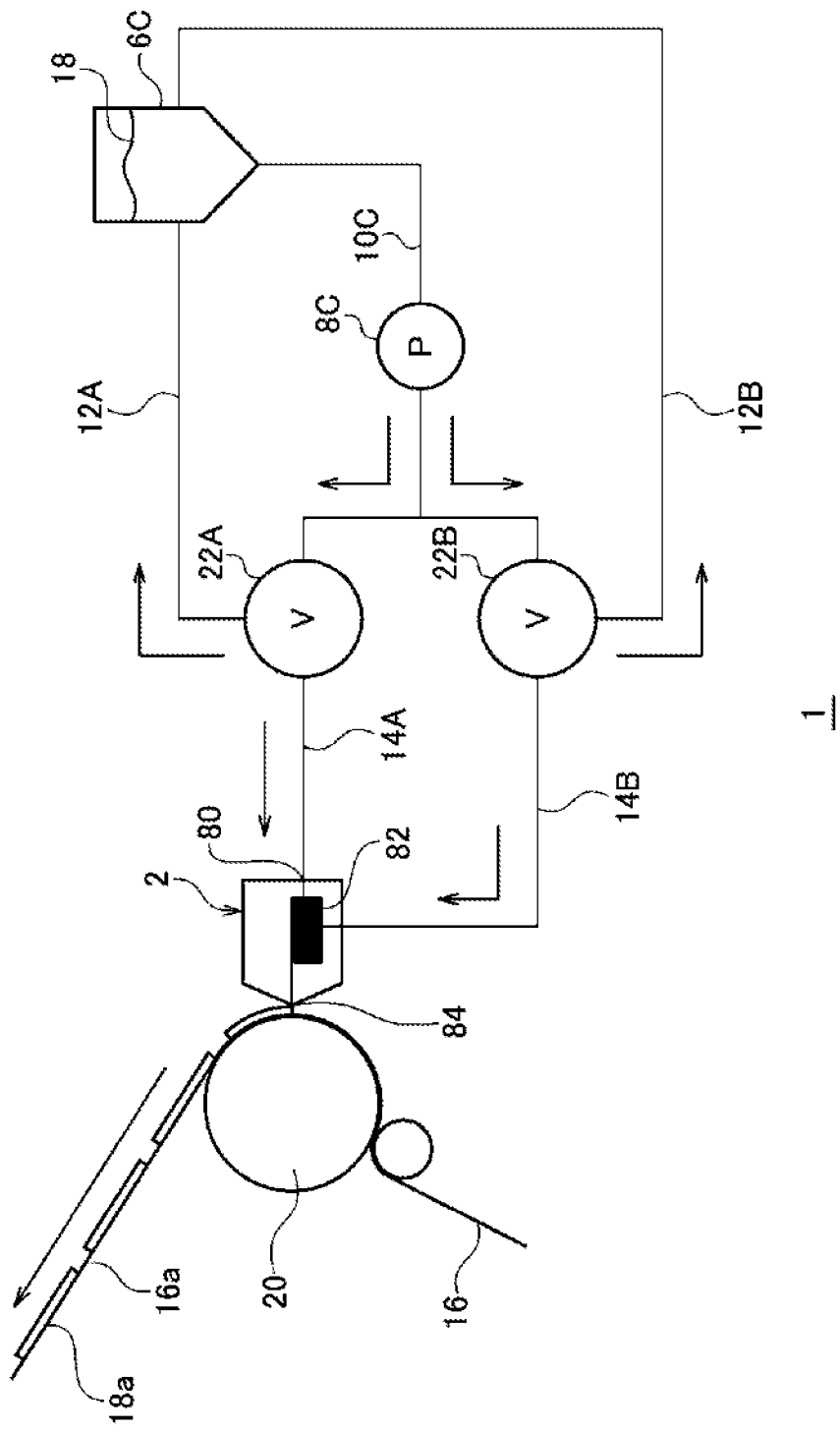
FIG. 6 is a schematic diagram of an intermittent coating device according to a third embodiment.

The third embodiment includes configurations in common with the second embodiment, except that a tank, a pump, and a feed pipe conduit are shared for two intermittent valves. In the following, the present embodiment will be described mainly for configurations different from those in the first and second embodiments, and description of configurations in common will be briefly given or may be omitted. FIG. 6 is a schematic diagram of the intermittent coating device according to the third embodiment. In FIG. 6, illustration of the control device 100 is omitted.

The intermittent coating device 1 includes the die 2, the first intermittent valve 22A and the second intermittent valve 22B, a common tank 6C, a common pump 8C, a common feed pipe conduit 10C, the first return pipe conduit 12A and the second return pipe conduit 12B, and the first die supply pipe conduit 14A and the second die supply pipe conduit 14B.

The die 2 includes the supply port 80, the manifold 82, and the discharge port 84. To the die 2, the first intermittent valve 22A is connected via the first die supply pipe conduit 14A, and the second intermittent valve 22B is also connected via the second die supply pipe conduit 14B. As is the case in the second embodiment, in the present embodiment, the first die supply pipe conduit 14A and the second die supply pipe conduit 14B are connected to the manifold 82 without being merged. Alternatively, as in the first embodiment, the two die supply pipe conduits 14 may be merged to be connected to the manifold 82 of the die 2.

To the first intermittent valve 22A, the common tank 6C is connected via the common feed pipe conduit 10C and the first return pipe conduit 12A. To the second intermittent valve 22B, the common tank 6C is connected via the common feed pipe conduit 10C and the second return pipe conduit 12B. The common tank 6C stores the coating material 18. One end of the common feed pipe conduit 10C is connected to the common tank 6C. The other end of the common feed pipe conduit 10C is branched into two; one of the branched ends is connected to the first intermittent valve 22A, and the other of the branched ends is connected to the second intermittent valve 22B.

On the common feed pipe conduit 10C, the common pump 8C is provided. With the common pump 8C driven, the coating material 18 is fed from the common tank 6C to the first intermittent valve 22A and the second intermittent valve 22B. The first intermittent valve 22A supplies the coating material 18 from the common tank 6C to the die 2 through the first die supply pipe conduit 14A. Also, the first intermittent valve 22A returns the coating material 18 from the common tank 6C to the common tank 6C through the first return pipe conduit 12A. Similarly, the second intermittent valve 22B supplies the coating material 18 from the common tank 6C to the die 2 through the second die supply pipe conduit 14B. Also, the second intermittent valve 22B returns the coating material 18 from the common tank 6C to the common tank 6C through the second return pipe conduit 12B.

The timings of switching between the first state and the second state of each of the first intermittent valve 22A and the second intermittent valve 22B are identical with those in the first embodiment.

Thus, the intermittent coating device 1 of the present embodiment includes the common tank 6C associated with the two intermittent valves 22, and the common pump 8C that feeds the coating material 18 from the same common tank 6C to both the first intermittent valve 22A and the second intermittent valve 22B. Also, since the tank and the pump are shared, the feed pipe conduit can also be shared. Therefore, since the tank, the pump, and the feed pipe conduit are shared for the two intermittent valves 22, the number of necessary parts and the manufacturing cost of the intermittent coating device 1 can be reduced.

Exemplary embodiments of the present disclosure have been described in detail. Each of the abovementioned embodiments merely describes a specific example for carrying out the present disclosure. The embodiments are not intended to limit the technical scope of the present disclosure, and various design modifications, including changes, addition, and deletion of constituting elements, may be made to the embodiments without departing from the scope of ideas of the invention defined in the claims. Such an additional embodiment with a design modification added has the effect of the combined embodiment and modifications. In the aforementioned embodiments, matters to which design modifications may be made are emphasized with the expression of "of the present embodiment", "in the present embodiment", or the like, but design modifications may also be made to matters without such expression. Optional combinations of constituting elements included in each embodiment may also be employed as additional aspects of the present disclosure. Also, the hatching provided on the cross sections in the drawings is not provided to limit the materials of the objects with the hatching.

Although the intermittent coating device 1 in each embodiment includes two intermittent valves 22, the intermittent coating device 1 may include three or more intermittent valves 22. Also, the return pipe conduit 12 is disposed on the side closer to the first opening 32 through which the piston 30 is inserted, and the die supply pipe conduit 14 is disposed on the side farther from the first opening 32. However, the arrangement of the conduits may be opposite. In this case, when the piston 30 is shifted out of the cylinder 28 from the second position, the piston 30 is set to the first position; when the piston 30 is shifted into the cylinder 28 from the first position, the piston 30 is set to the second position.

The invention claimed is:

1. An intermittent coating device, comprising:
   a die used to apply a coating material onto a material;
   a first intermittent valve and a second intermittent valve capable of switching between a first state in which the coating material is supplied to the die and a second state in which supply of the coating material is stopped;
   a first die supply pipe conduit that connects the first intermittent valve and the die;
   a second die supply pipe conduit that connects the second intermittent valve and the die; and
   a processor configured to control the first intermittent valve and the second intermittent valve, wherein
   the first intermittent valve and the second intermittent valve have different timings of switching between the first state and the second state,
   both the first intermittent valve and the second intermittent valve are connected to the die,
   both the first die supply pipe conduit and the second die supply pipe conduit are connected to the die without being merged,
   the die has a supply port, only one space part, and a discharge port,
   the first die supply pipe conduit and the second die supply conduit are connected to the supply port,
   the space part communicates with the supply port and the discharge port and has a volume greater than a volume of a flow passage from the supply port to the space part and a volume of a flow passage from the space part to the discharge port,
   both the coating material fed from the first intermittent valve and the coating material fed from the second intermittent valve flow into the space part, and the space part temporarily stores the coating material to be fed from the supply port and then fed to the discharge port,
   the discharge port discharges the coating material to the material,
   when a predetermined period of time has elapsed after the first intermittent valve placed in the first state is switched to the second state, the processor is configured to switch the second intermittent valve placed in the second state to the first state,
   when a predetermined period of time has elapsed after the second intermittent valve placed in the first state is switched to the second state, the processor is configured to switch the first intermittent valve placed in the second state to the first state, and
   the processor is configured to:
      switch one of the first intermittent valve and the second intermittent valve in the first state to apply the coating material on the material, wherein the coating material applied to the material forms a single-layer of the coating material, and
      switch both the first intermittent valve and the second intermittent valve in the second state for the predetermined period of time not to apply the coating material on the material.

2. The intermittent coating device according to claim 1, wherein,
   when a predetermined period of time has elapsed after the first intermittent valve placed in the first state is switched to the second state, the second intermittent valve placed in the second state is switched to the first state, and,
   when a predetermined period of time has elapsed after the second intermittent valve placed in the first state is switched to the second state, the first intermittent valve placed in the second state is switched to the first state.

3. The intermittent coating device according to claim 1, further comprising:
   a first tank and a second tank that store the coating material;
   a first pump that feeds the coating material from the first tank to the first intermittent valve; and
   a second pump that feeds the coating material from the second tank to the second intermittent valve.

4. The intermittent coating device according to claim 1, further comprising:
   a single tank that stores the coating material; and
   a pump that feeds the coating material from the single tank to both the first intermittent valve and the second intermittent valve.

5. The intermittent coating device according to claim 1, wherein
   the material to be coated is a current collector of a secondary battery, and
   the coating material is electrode slurry of a secondary battery.

6. An intermittent coating device, comprising:
   a die used to apply a coating material onto a material to be coated, the die comprising a discharge port for the coating material and also comprising a single manifold that communicates with the discharge port;
   a first intermittent valve and a second intermittent valve capable of switching between a first state in which the coating material is supplied to the die and a second state in which supply of the coating material is stopped;
   a first die supply pipe conduit that connects the first intermittent valve and the single manifold;

a second die supply pipe conduit that connects the second intermittent valve and the single manifold; and a processor configured to control the first intermittent valve and the second intermittent valve, wherein the first intermittent valve and the second intermittent valve have different timings of switching between the first state and the second state, both the first intermittent valve and the second intermittent valve are connected to the single manifold, both the first die supply pipe conduit and the second die supply pipe conduit are connected to the single manifold without being merged, when a predetermined period of time has elapsed after the first intermittent valve placed in the first state is switched to the second state, the processor is configured to switch the second intermittent valve placed in the second state to the first state, when a predetermined period of time has elapsed after the second intermittent valve placed in the first state is switched to the second state, the processor is configured to switch the first intermittent valve placed in the second state to the first state, and the processor is configured to:
  switch one of the first intermittent valve and the second intermittent valve in the first state to apply the coating material on the material, wherein the coating material applied to the material forms a single-layer of the coating material, and
  switch both the first intermittent valve and the second intermittent valve in the second state for the predetermined period of time not to apply the coating material on the material, the material to be coated is a current collector of a secondary battery, and the coating material is electrode slurry of a secondary battery.

* * * * *